PIPE-LAYING BARGE WITH ADJUSTABLE PIPE DISCHARGE RAMP

Original Filed Dec. 8, 1966 3 Sheets-Sheet 1

INVENTORS:
DOUGLAS E. BROUSSARD
DONALD W. BARRY
ROBERT B. KINZBACH
STUART G. KERSHNER
BY: J. H. McCarthy
THEIR AGENT

PIPE-LAYING BARGE WITH ADJUSTABLE PIPE DISCHARGE RAMP

Original Filed Dec. 8, 1966 3 Sheets-Sheet 2

INVENTORS:
DOUGLAS E. BROUSSARD
DONALD W. BARRY
ROBERT B. KINZBACH
STUART G. KERSHNER
BY: J. H. McCarthy
THEIR AGENT

PIPE-LAYING BARGE WITH ADJUSTABLE PIPE DISCHARGE RAMP

Original Filed Dec. 8, 1966 3 Sheets-Sheet 3

INVENTORS:
DOUGLAS E. BROUSSARD
DONALD W. BARRY
ROBERT B. KINZBACH
STUART G. KERSHNER
BY: J. H. McCarthy
THEIR AGENT United States Patent Office Re. 27,0
Reissued Mar. 23, 1

27,088

PIPE-LAYING BARGE WITH ADJUSTABLE PIPE DISCHARGE RAMP

Douglas E. Broussard, Houston, Tex., Donald W. Barry, Centralia, Ill., and Robert B. Kinzbach, Houston, and Stuart G. Kershner, Austin, Tex., assignors to Shell Oil Company, New York, N.Y.

Original No. 3,438,213, dated Apr. 15, 1969, Ser. No. 600,196, Dec. 8, 1966. Application for reissue Jan. 22, 1970, Ser. No. 10,665

Int. Cl. B63b *5/04;* F16l *1/00*

U.S. Cl. 61—72.3 19 Claims

Matter enclosed in heavy brackets [ ] appears in the original patent but forms no part of this reissue specification; matter printed in italics indicates the additions made by reissue.

ABSTRACT OF THE DISCLOSURE

A pipe-laying apparatus for laying pipe on a water floor comprising a pipe-laying vessel having an articulated, adjustable, curved guide for directing a pipeline into the water and adjustment means for selectively varying the curvature of the guide to accommodate differing pipe sizes and water depths.

This invention relates to pipe-laying vessels and more particularly to a pipe-laying barge employing apparatus for controlling the curvature of a pipeline as it leaves the barge.

With the increased development of gas and oil wells offshore, demand for pipe-laying apparatus to connect underwater facilities or to bring products to shore has increased. Frequently, barges are employed to lay underwater pipelines along the floor of a body of water by assembling pipe lengths on the barge and moving the barge as the assembled pipeline is payed out and laid onto the ocean floor. Also, the pipe lengths may be preassembled and wound onto a reel which is then rotatably mounted on the barge. The pipe employed is generally made of steel and capable of withstanding some bending but any bending of the assembled pipeline must stay within predetermined limits to avoid kinking or permanently deforming the pipeline which would render it ineffective. It will be observed that as pipeline is laid from a barge the pipe exists the barge and follows a somewhat S-shaped configuration from the barge deck to the ocean floor. In relatively shallow waters, the vertical descent of the pipeline, being small, results in a large radius of curvature of the pipeline as it comes off the barge. However, as the water depth increases, the length of unsupported pipeline increases causing the pipeline to sag under its weight. Thus the radius of curvature of the pipeline as it leaves the barge becomes smaller and the bending moments imposed on the pipeline may exceed the allowable limits and result in permanent deformation or kinking of the pipeline.

Accordingly, it is a primary object of this invention to provide a pipe-laying apparatus which is adapted to lay pipeline on the floor of a body of water without damaging the pipeline.

It is another object of this invention to provide a pipe-laying apparatus that will limit the radius of curvature of the pipeline as it leaves a pipe-laying barge.

Still another object is to provide apparatus which is adjustable to vary the radius of curvature of the pipeline as it is being laid.

It is a further object to provide the apparatus with means to impose an axial tension on the pipeline as it is laid.

A still further object is to provide sensing means on said apparatus to indicate the position of said pipeline relative to the apparatus for controlling the position o pipe-laying barge and for controlling the shape of loads applied to said apparatus.

These and other objects will become apparent the reading of the following detailed description t in conjunction with the accompanying drawings in wl FIGURE 1 is an elevation of a pipe-laying b incorporating the apparatus of the present inventior FIGURE 2 is a cross-sectional view taken along 2—2 of FIGURE 1;

Figure 1:
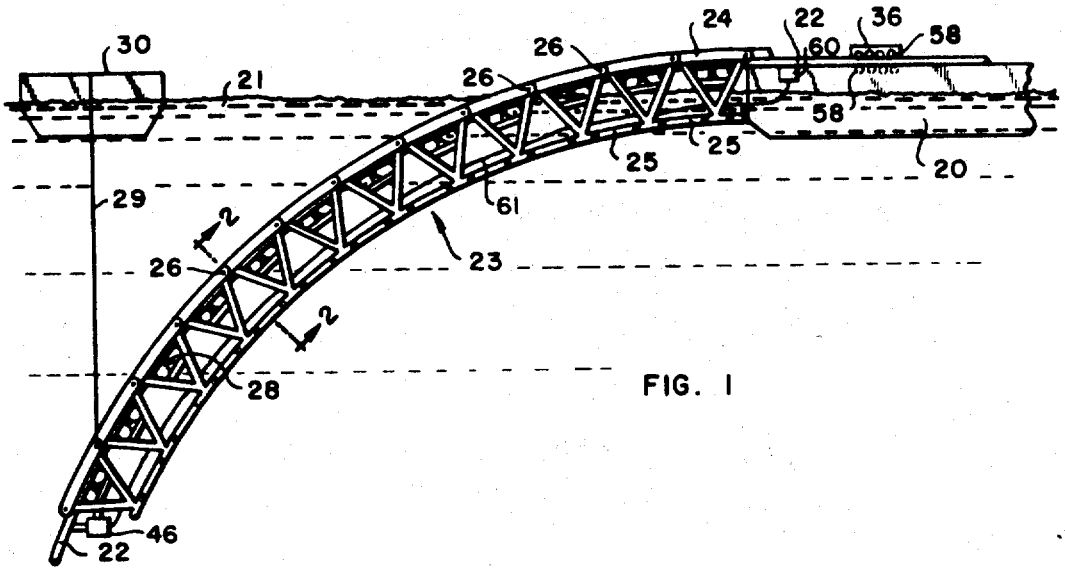

Referring now to FIGURE 1, a pipe-laying bar is shown positioned on the surface of a body of 21. The barge may be of any suitable type known i art adapted for laying a continuous pipeline 22 the floor of a body of water. For example, the may be of a type in which pipe sections are joine example, by welding, on the deck of the barge or i be a reel-type barge in which a spool or reel, wounc assembled pipe lengths, is rotatably mounted o deck of the barge so that as the barge is moved th unwinds thereby paying out the pipeline.

Figure 11:
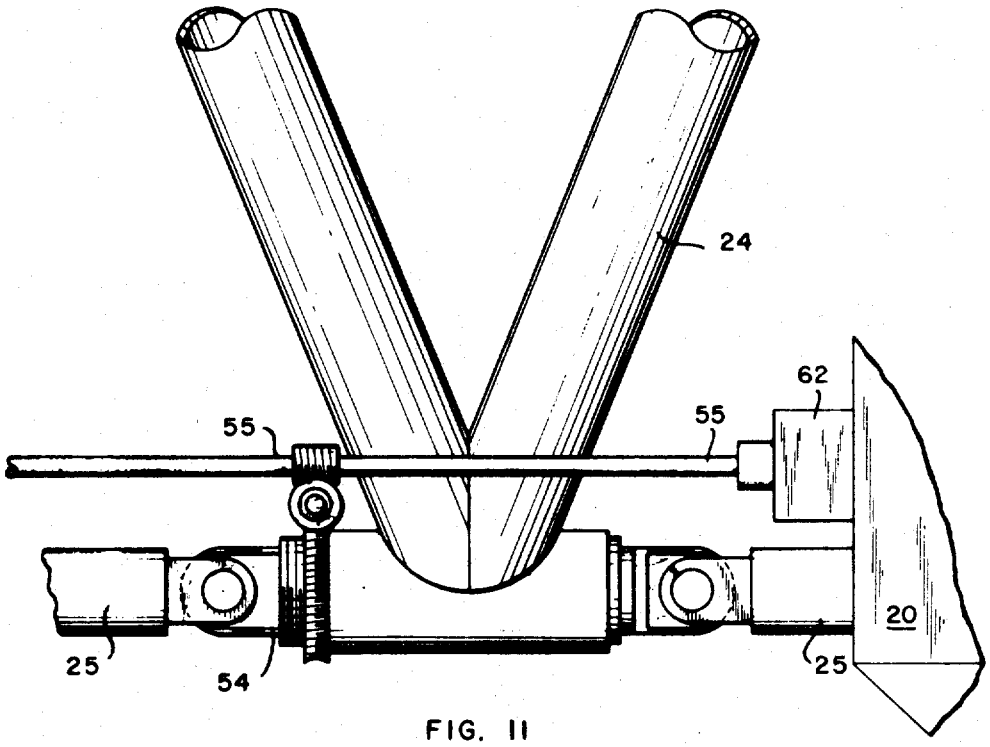
FIGURE 11 is a detail view in elevation of a pc of the subject apparatus showing adjusting mean varying the curvature of the device.

Fixedly attached to the barge 20 at the point the line 22 leaves the barge is a so-called "moment-lir guide" or articulated discharge pipe ramp indicate erally by the numeral 23. The guide is compris pivotally joined sections 24 each having the general of an inverted cone. Interposed between the sectic are extensible members 25 which can be rer extended or shortened from the barge 20. It will b that the members 25 form chordal segments or an [ *arc* so that when they are shortened or lengthen radius of the arc is varied. As best seen in FIGUF each member 25 is pivotally joined to the sections means of an adjustable rod 54. The rod 54 is exten contracted by suitable gearing driven from the through a drive shaft 55. Although the adjusting n nism for only one section 24 is shown in FIG. 11, be understood that similar adjusters are provided fo section 24 and may all be driven simultaneously by of prime mover 62 through drive shaft 55. Of c other means of adjusting the member 25 may b ployed without departing from the invention, e. rods 54 may be hydraulically actuated or electrical may be employed. When the members 25 are sho the pivotally joined sections 24 move about piv thereby varying the radius of curvature of the moment-limiting guide 23.

Figure 2:
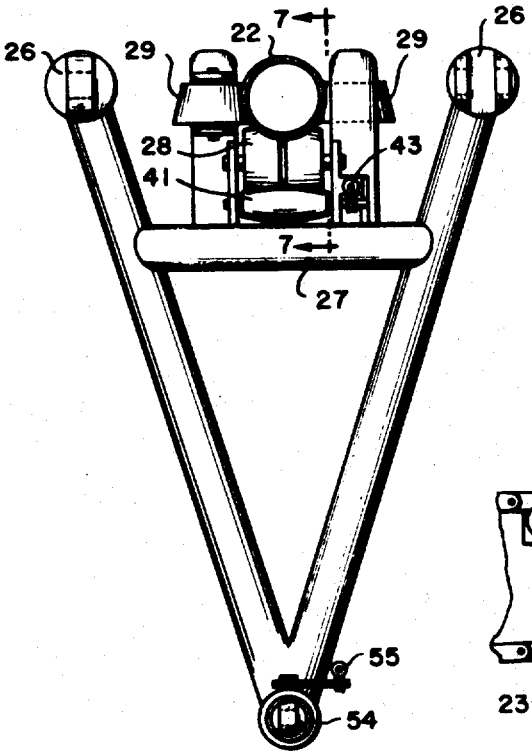

Each [sections] *section* 24 includes cross-brac which rotatably carries pipe-engaging support rollers 28 and lateral restraining rollers 29, as shown in FIGURE 2. These rollers provide a continuous cradle or trough for the pipeline 22 as it is payed out. Thus, it will be seen that when a plurality of the sections 24 are pivoted about pivot pins 26, the radius of curvature of the cradle formed by a plurality of the rollers 28 and 29 is also varied thereby controlling the curvature of pipeline 22. Since the moment-limiting guide is a [contilevered] *cantilevered* structure, it is preferable to support the free end with a guideline [29] *29'* secured to an auxiliary vessel 30. Other suitable means may be employed, e.g., a buoy may be used in place of the vessel 30.

Figure 3:
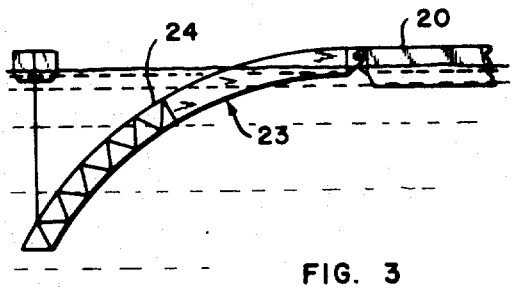
FIGURE 3 is an elevation showing a modified for the invention.

One modification of the moment-limiting guide 23 is shown in FIGURE 3. In this arrangement only a portion of the guide 23 is made of pivotally joined sections. As shown, approximately the first or inboard half of the guide is constructed in a fixed arc with the remainder of the guide being made up of pivotal sections 24 in the manner described hereinabove with reference to FIGURES 1 and 2.

Figure 4:
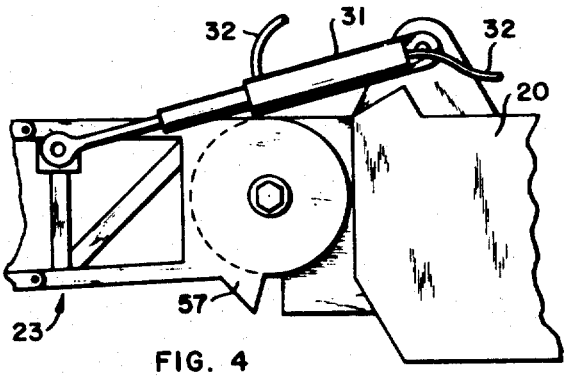
FIGURE 4 is a detail view of one arrangemen attaching the subject apparatus to a lay barge.

In addition, the guide 23 may be pivotally joined to the barge 20. The guide may be freely pivoted as shown in FIGURE 3 or an air spring 31 may be connected between the barge 20 and the guide 23 (see FIGURE 4). The air spring 31 dampens the action of the guide in the event of sudden loading or unloading. By varying the air supply through hoses 32 to either side of a cylinder (not shown) within the air spring 31 the entire guide 23 can be pivoted to any desired position. A stop 57 may be secured to the guide to limit the downward movement of the guide 23 with respect to the barge 20.

Figure 5:
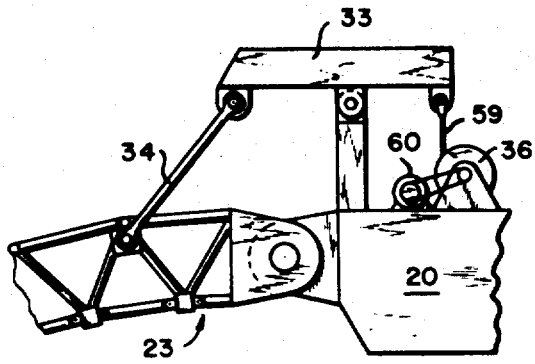
FIGURE 5 is a detail view showing another arr ment for attaching the apparatus.

Another arrangement for pivoting the entire guide 23 is shown in FIGURE 5. A rocking beam 33 is connected at one end to a tie rod 34 and the other end is operably connected by cable 59 to reel 36 driven by motor 60. It will be seen that the motor 60 will move or rock beam 33 and the movement will be translated to the guide 23 through the tie rod 34, thereby pivoting the guide with respect to the barge 20.

Figure 6:
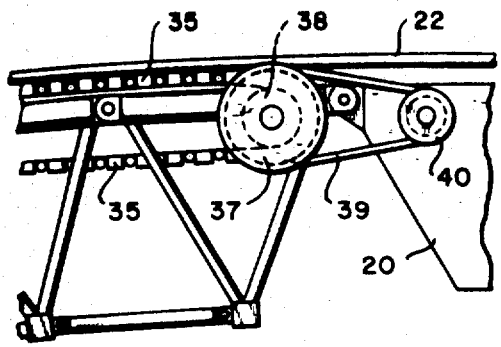
FIGURE 6 is a detail view showing a drive mean a pipe tensioning belt which may be incorporated i present invention.

Other means for supporting the pipeline 22 along the moment-limiting guide 23 may be employed in place of or in addition to rollers. For example, as shown in FIGURE 6, an endless belt 35 may be used in place of the rollers 28 and 29 shown in FIGURE 2. The belt 35 preferably extends the length of the guide 23 with the upper surface exposed to support pipeline 22. In order to prevent the pipeline from moving laterally off the belt 35, the belt may be constructed with a pipe-engaging groove or the belt may have a somewhat V cross-section to cradle and laterally restrain the pipeline.

In some pipe-laying operations, particularly in deep water, it may be desirable to apply a predetermined axial tension of the pipeline as it is being laid in order to change or reduce the natural curvature assumed by the pipeline in the water. This tension tends to straighten the pipeline somewhat thereby reducing the curvature at the point the pipeline contacts the ocean floor. Accordingly, suitable tensioning means may be employed in conjunction with the present invention.

As shown in FIGURE 1, a dyamic braking device 36 including a series of pipe-engaging tension rollers 58 may be mounted on the deck of barge 20. By dynamically braking the rollers or increasing their frictional contact with the pipeline 22, a tension will be imposed in the pipeline. The amount of tension required can be predetermined analytically. As the position of the vessel is varied, which is typically controlled with tugs or by winching in lead anchor lines while paying out trailing anchor lines, constant tension will be maintained in the pipeline by the braking device 36. Also, when the barge 20 is at rest, e.g., when additional pipe lengths or equipment is being taken aboard, the predetermined tension will be maintained by the device 36 or by attaching the end of the pipeline to a constant tension winch.

An alternative arrangement for applying the tension is shown in FIGURE 6 wherein the endless belt 35 is dynamically braked in a direction opposite to the direction the pipeline is being laid. A pulley 37 may be attached to roller 38 and connected through belt 39 to a slip drive 40 located on the barge 20. The belt is not driven so that the frictional contact between pipeline 22 and belt 35 is broken but the slip drive does restrain the free travel of the belt to thereby tension the pipeline. Of course, other suitable brakes or slip drives may be used to dynamically brake the belt 35, e.g., a friction brake may be attached to the shaft of roller 38 or other frictional devices may be used to restrain the belt 35.

Figure 7:
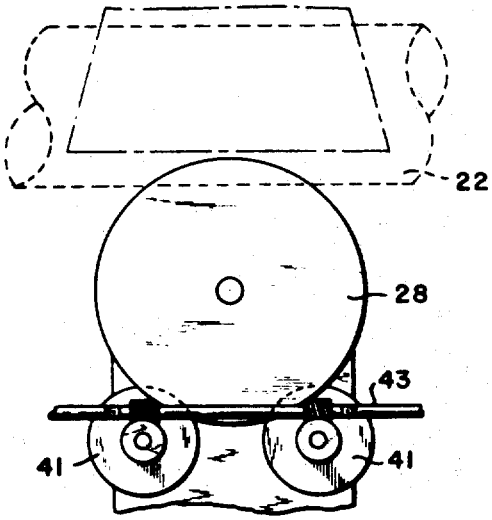
FIGURE 7 is a schematic cross-section taken alon lines 7—7 of FIGURE 2.

In the embodiment shown in FIGURE 2, the support rollers 28 can be braked to tension the pipeline 22 by means of drive rollers 41 in rolling contact with support rollers 28. As best seen in FIGURE 7, the drive rollers can be oppositely driven from the barge 20 by an articulated drive shaft 43 carrying worm gears [43] *43'*. The worm gears mesh with pinions attached to the shafts of rollers 41.

The arrangements discussed above for imparting tension to the pipeline 22 are by way of example only and other devices can be readily substituted by one skilled in the art.

When the moment-limiting guide 23 is in use it will be observed that a major portion of the guide is generally disposed beneath the surface of the water. This condition precludes a visual inspection to determine if the pipeline 22 is maintaining proper contact with the guide 23. It will be apparent that if the barge 20 is too far forward the pipeline will be pulled out of contact with the guide. Conversely, if the barge is not advanced rapidly enough, the pipeline may bend about the free end of the guide with the free end acting as a fulcrum thereby causing the pipeline to form a "hump" along the length of the guide.

Figure 8:
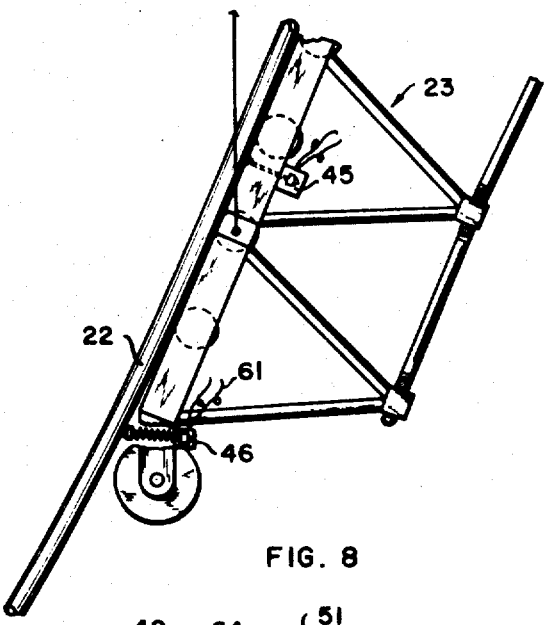
FIGURE 8 is a detail view in elevation of the end of the apparatus including pipe sensing means.

In order to obviate these conditions, it is desirable to employ some form of indication of the pipeline-to-guide contact which is readily observable to an operator on the barge 20, so that he may regulate the barge position. Accordingly, position-indicating means in the form of on-off switches 45 and 46 may be located on the guide 23 near its free end with spring loaded contact actuators positioned to bias against the pipeline 22. As shown *in FIGURE 8*, the pipeline 22 is in the desired curvature and maintains proper contact with the guide 23. In this condition switch 45 is closed and switch 46 is open. Suitable warning lights [60] *60'* connected to the switch by means of wire 61 and located on board the barge 20 provide a visual indication for the barge operator. In the event the barge is leading the laying operation, switch 45 will open and if the barge is trailing the operation switch 46 will be closed. When either condition exists, the barge operator is provided with a visual indication that the pipeline 22 is not maintaining proper contact with the guide 23 and the position of the barge is varied accordingly. Of course, switches 45 and 46 are shown by way of example only and it will be apparent that other means may be employed to give a visual indication of the position of the pipeline relative to the guide 23.

Figure 9:
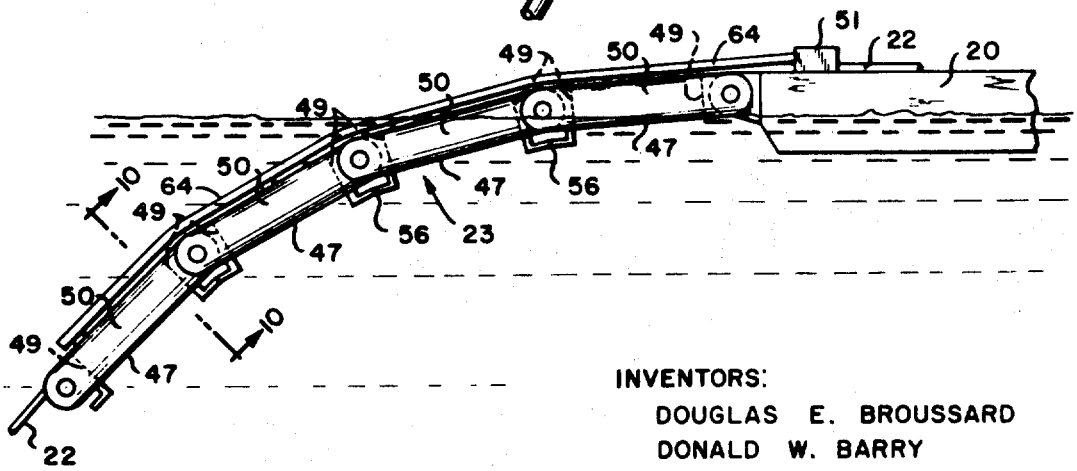
FIGURE 9 is an elevation showing another mo form of the invention.
Figure 10:
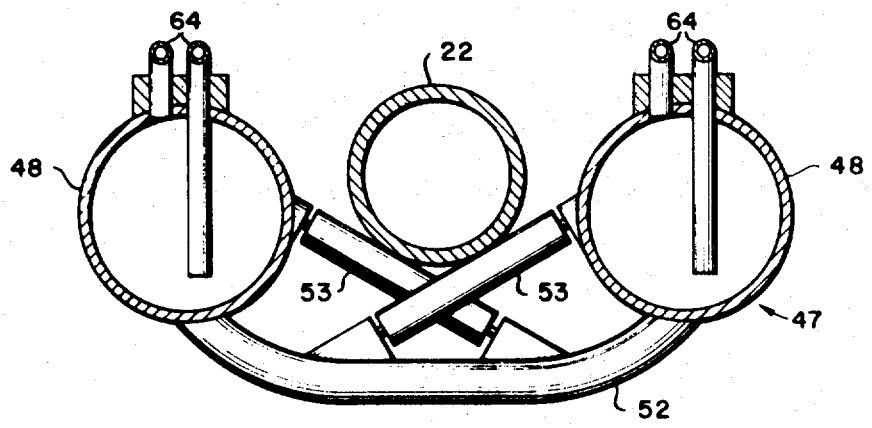
FIGURE 10 is a cross-section taken along the 10—10 in FIGURE 9.
Figure 12:
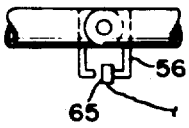
FIGURE 12 is a detail elevation view of the stop r employed with the modification shown in FIGUR and 10.

The moment-limiting guide 23 may also be of an articulated construction as shown in FIGURES 9 and 10. This guide is comprised of pivotally joined sections 47 each containing tubular members 48 connected by cross-bracing 52 which carries suitable rollers 53 in the shape of a V to support the pipeline 22. Each tubular member is fitted with one or more bulkheads 49 to form buoyancy chambers 50 within the members 48. Each section 47 is provided with an adjustable positive stop 56 which establishes the minimum radius of curvature that can be assumed by the guide. Suitable pumping means 51 on the barge 20 supply air to the chambers 50 through a plurality of conduits or hoses 64. Alternatively, remote valve means (not shown) operated from the barge 20 can be employed to selectively flood the chambers 50. It will be seen that as the chambers 50 are flooded, the contained sea water provides negative buoyancy which in combination with the weight of pipe 22 bends the guide 23 into the position of maximum curvature. When the sea water is evacuated, the guide will tend to assume a more gradual curvature. As shown in FIGURE 12 one or more of the stops 56 may contain suitable means 65 for measuring the force applied to the stop and indicating this force on board the barge 20. This information will be used to regulate the buoyancy in the various sections 47 to achieve the most desirable shape in the guide 23 for any particular pipe-laying operation.

Since the moment-limiting guide may not be structurally capable of carrying the large loads that would be imposed upon it in laying a pipeline in deep water, the support for the pipeline is preferably achieved by monitoring the loads on the guide and regulating the buoyancy along the length of the guide to minimize these structural loads. This considerably reduces the size of the structure required to support the pipe and simplifies the mechanism required for controlling its shape.

A buoyant moment-limiting guide with adjustable stops as disclosed in FIGURES 9 and 10 has the further advantage in that the section 47 may be interchangeable to permit replacement of damaged sections and it may be easily shortened or lengthened. In addition, the [stringer] *moment-limiting guide* may be disassembled for shipment or storage and may be assembled or disassembled at sea as may be required.

We claim as our invention:

1. A pipe-laying apparatus for laying pipe along the floor of a body of water comprising:

a pipe-laying vessel positionable on said body of water and adapted to pay out assembled pipe lengths along the floor of said body of water as said vessel is moved;

a pipe supporting moment-limiting guide attached to said vessel at [a] *the* point said pipe is payed out from said vessel;

said moment-limiting guide comprising an elongated arcuate pipe support structure of pivotally joined sections extending outwardly and downwardly away from said point in a substantially vertical plane;

adjusting means operatively connected to all of said sections to move said section relative to each other in at least one direction in said vertical plane to thereby vary the curvature of said moment-limiting guide;

prime mover means carried by said vessel; and power transmission means operatively connected between said prime mover means and said adjusting means for actuating said adjusting means.

2. The apparatus as defined in claim 1 wherein the joined sections of said pipe support structure comprise a plurality of articulated sections.

3. The apparatus as defined in claim 2 including lateral restraining pipe carrying means mounted on said moment-limiting guide to prevent substantial sideways movement of said pipe as it moves along said guide.

4. The apparatus as defined in claim 1 including pipe-tensioning braking means carried by said moment-limiting guide in pipe engagement to restrain the paying out of said pipe to thereby impose a predetermined axial tension on said pipe.

5. The apparatus as defined in claim 4 wherein said braking means comprise:

an endless belt arranged to travel in the direction said pipe is being payed out.

6. The apparatus as defined in claim 5 wherein said braking means further include:

slip-drive means in driving engagement with said belt to drive said belt in a direction opposite to the direction said pipe is being payed out.

7. The apparatus as defined in claim 1 further including:

cooperating restraining means mounted between sa moment-limiting guide and said vessel to restra pivotal movement at all times of said moment-lim ing guide with respect to said vessel; and pivot connection means to connect said moment-lim ing guide to said vessel.

8. The apparatus as defined in claim 7 wherein sa restraining means comprise a fluid damper.

9. The apparatus as defined in claim 7 wherein sa restraining means comprise:

first and second cooperating pivoting means mount on said moment-limiting guide and said vessel spectively, at leasst one of said means includi actuating means to thereby pivot said moment-lim ing guide relative to said vessel.

10. The apparatus as defined in claim 1 including:

at least one load sensor positioned on said mome limiting guide adjacent said pipe to sense the lc imposed by said pipe on said moment-limiting gui and, a load indicator positioned on said vessel and in ope tive connection with said load sensor to indicate load imposed by said pipe.

11. The apparatus as defined in claim 1 including a tension indicator on said vessel and in operative c nection with said pipe to indicate the axial tens on said pipe.

12. The apparatus as defined in claim 1 wherein s adjusting means comprise:

extensible members interconnecting each of said pi ally joined sections; and actuating means for changing the effective length said extensible members.

13. The apparatus as defined in claim 12 wherein said prime mover means comprise motor means; a said power transmission means comprise drive sl means operatively interconnecting said motor me and said actuating means.

14. An apparatus as defined in claim 1 wherein adjusting means comprise variable buoyancy chan means.

15. An apparatus as defined in claim 14 wherein:

said prime mover means comprise fluid pum means; and said power transmission means comprise fluid con means operatively interconnecting said fluid pu ing means and said chamber means for selecti varying the buoyancy of said chamber means 16. The apparatus as defined in claim 15 inclu adjustable positive stops on said sections to limit curvature of said pipe support structure.

17. The apparatus as defined in claim [15] *16* inc ing:

at least one load sensor positioned on said mon limiting guide at each of said positive stops to s the load imposed on said positive stop; and a load indicator positioned on said vessel and in o tive connection with said load sensor to indicat load imposed on said positive stop.

*18. A pipe-laying apparatus for laying pipe along floor of a body of water comprising:*

*a pipe-laying vessel positionable on said body of and adapted to pay out assembled pipe lengths the floor of said body of water as said vess moved;*

*a pipe supporting moment-limiting guide attach said vessel at the point said pipe is payed out said vessel;*

*said moment-limiting guide comprising an elon arcuate pipe support structure of pivotally sections extending outwardly and downwardly from said point in a substantially vertical pla*

*adjusting means operatively connected to all of sections to move said sections relative to each in at least one direction in said vertical pla*

*thereby vary the curvature of said moment-limiting guide;*

*prime mover means operatively connected to said adjusting means; and*

*power transmission means operatively connected between said prime mover means and said adjusting means for actuating said adjusting means.*

*19. The apparatus as defined in claim 18 wherein the joined sections of said pipe support structure comprise a plurality of articulated sections.*

References Cited

The following references, cited by the Examiner, are of record in the patented file of this patent or the original patent.

UNITED STATES PATENTS

| | | | |
|---|---|---|---|
| 3,054,267 | 9/1962 | Alcorn et al. | 61—46.5 |
| 3,247,674 | 4/1966 | Macardier | 61—72.3 |
| 3,280,571 | 10/1966 | Hauber et al. | 61—72.1 |
| 3,331,212 | 7/1967 | Cox et al. | 61—72.3 |

FOREIGN PATENTS

| | | |
|---|---|---|
| 885,276 | 12/1961 | Great Britain. |
| 625,728 | 9/1961 | Italy. |

JACOB SHAPIRO, Primary Examiner